J. N. TUTTLE.
ELECTROLYTIC METER.
APPLICATION FILED MAR. 27, 1914.
1,171,279.
Patented Feb. 8, 1916.
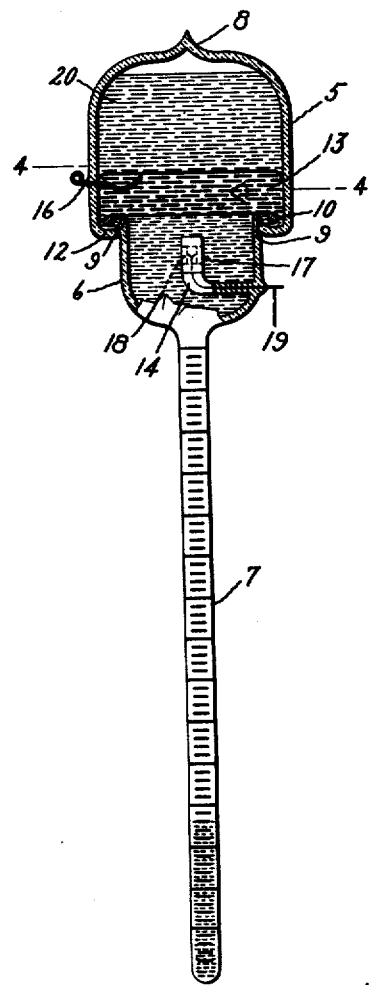
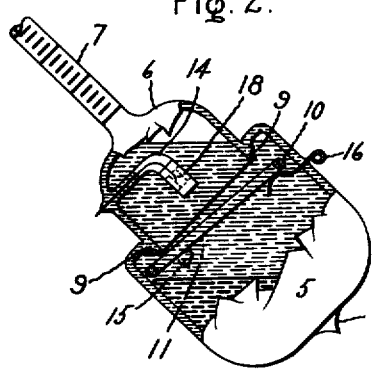
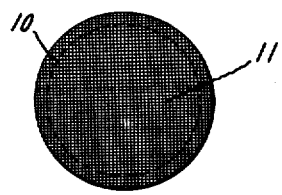
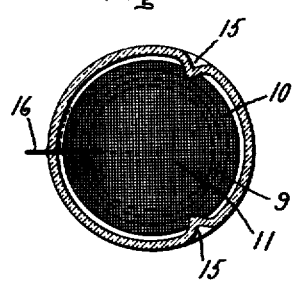
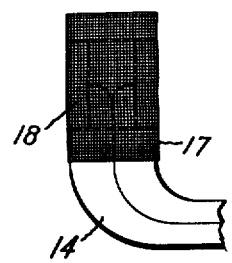
Witnesses:
Earl G. Klock.
J. Ellis Glen.
Inventor:
James N. Tuttle,
by Albert G. Davis
His Attorney.

UNITED STATES PATENT OFFICE.

JAMES N. TUTTLE, OF HARWICHPORT, MASSACHUSETTS, ASSIGNOR TO GENERAL ELECTRIC COMPANY, A CORPORATION OF NEW YORK.

ELECTROLYTIC METER.

1,171,279.         Specification of Letters Patent.         Patented Feb. 8, 1916.

Application filed March 27, 1914. Serial No. 827,602.

*To all whom it may concern:*

Be it known that I, JAMES N. TUTTLE, a citizen of the United States, residing at Harwichport, county of Barnstable, State of Massachusetts, have invented certain new and useful Improvements in Electrolytic Meters, of which the following is a specification.

My invention relates to electrolytic meters, and particularly to electrolytic meters that depend for their action upon the decomposition of an electrolyte by the electric current.

My invention particularly relates to that type of electrolytic meter in which the anode is a body of mercury. Meters of this type generally consist of a suitable vessel for the electrolyte and means located in the upper part of the vessel and above a suitable cathode for supporting the anode mercury.

The objects of my invention are to generally improve the construction of this type of meter, and to provide a simple and compact meter which is cheap to manufacture and efficient in operation.

A more particular object of my invention is to provide a construction of meter which can be assembled and sealed in a single integrally constructed vessel.

A further object of my invention is to provide a novel and improved construction of supporting diaphragm for the anode mercury in an electrolytic meter of the type to which my invention relates.

The novel features which I believe to patentably characterize my invention are definitely indicated in the claims appended hereto.

The details of construction and mode of operation of a meter embodying my invention will be understood by reference to the following description taken in connection with the accompanying drawings, in which:—

Figure 1 is an elevation, partly in section, of my improved construction of electrolytic meter in its normal operating position; Fig. 2 is a view, partly in section, showing the meter tilted out of its normal operating position, and illustrating the action of my improved movable diaphragm; Fig. 3 is a detail view of the movable diaphragm; Fig. 4 is a cross-sectional view on the line 4—4 of Fig. 1; and Fig. 5 is an enlarged view of the cathode employed in the meter.

The operative elements of my improved construction of electrolytic meter are adapted to be hermetically sealed within an integrally constructed containing vessel. The general configuration of this vessel is clearly shown in Fig. 1 of the drawings. The containing vessel comprises an anode chamber 5 of circular section, a cathode chamber 6, of smaller sectional diameter than the anode chamber, and a fall tube 7 extending below the cathode chamber and adapted to receive the mercury deposited at the cathode of the meter. I have indicated the fall tube 7 suitably graduated, in order that the amount of the deposited mercury therein can be conveniently measured. It will, of course, be understood that any other convenient means of measuring the quantity of mercury deposited in the fall tube may be employed. The anode chamber 5, the cathode chamber 6, and the fall tube 7 of the containing vessel are integrally constructed and form a single container for the operative elements of the meter. Preferably, this container is constructed of glass, but other suitable materials will be obvious to those skilled in the art. When the operative elements of the meter are assembled within the container the upper end of the anode chamber is sealed at 8, whereby the vessel can be opened only by fracturing the material of which it is made.

An annular ridge 9 is formed between the anode and the cathode chambers. This ridge is adapted to form a support for the novel and improved movable diaphragm of my invention. This diaphragm consists of a circular supporting member 10, which may be of glass, platinum, or other suitable material not affected by the electrolyte, and across which is stretched and suitably secured a piece of diaphragm material 11, which is permeable to the electrolyte of the meter but impermeable to mercury. I have found finely woven fabrics of a material not affected by the electrolyte of the meter very suitably adapted as diaphragm materials. Fabrics having a mesh of about 200 per square inch are of sufficiently fine weave to very satisfactorily answer the requirements of a permeable diaphragm. I have further found bolting cloth having a mesh of 200x275 per square inch admirably suited for the diaphragm material. Bolting cloth is made of silk fiber and is unaffected by the material of the electroylte, and further does not shrink when placed in the electrolyte. The diaphragm material 11 may be secured to the supporting member 10 by stitching, or in any other convenient and suitable manner.

The movable diaphragm rests upon the annular ridge 9 when the meter is in its normal operating position. A trough 12 is provided between the ridge 9 and the outer wall of the anode chamber of the containing vessel for the accommodation of the supporting member 10 of the diaphragm. The diaphragm material 11 seats itself on the annular ridge 9, and the pressure of the body of anode mercury, resting thereon, insures a tight fit between the diaphragm material and the ridge, since there is enough flexibility in the diaphragm material to allow it to conform to the upper surface of the ridge, even though all parts of such surface are not in the same plane. The movable diaphragm supports a body of anode mercury 13, and prevents the passage of the mercury from the anode chamber to the cathode chamber except electrolytically.

A cathode of any suitable design is sealed into the cathode chamber below the movable diaphragm. In the drawings I have shown, merely by way of example, a mercury cathode of the novel character described and claimed in my patent application, Serial Number 725,219, filed October 11, 1912. It will, however, be well understood in the art that a carbon, platinum, iridium, or any other suitable cathode may be employed. The cathode herein illustrated comprises a cylindrical glass supporting member 14 having an annular groove 18, about $\frac{1}{16}$ of an inch deep, ground around the surface thereof. A leading-in wire 19 is sealed in the supporting and attaching member and has a plurality of ends extending into the groove. A strip of finely woven fabric, such as bolting cloth, is sewed together, forming a cloth cylinder 17, slightly larger in diameter than the diameter of the supporting member 14. This cloth cylinder is introduced into the meter through the upper end, which at this stage of the assembling is open, and slipped over the cathode, taking the position indicated in the drawings. When the meter has been assembled, as hereinafter described, current is passed therethrough, and the groove is gradually deposited full of mercury, which is retained in position in the groove by the cloth cylinder.

Two protuberances 15 are formed in the anode chamber above the movable diaphragm, and serve, in conjunction with a leading-in wire 16 sealed into the wall of the anode chamber, to limit the movement of the diaphragm when the meter is tilted out of its normal operating position, as indicated in Fig. 2 of the drawings. The protuberances 15 and the leading-in wire 16 are positioned approximately 120° apart, and the diaphragm is free to move between the same and the annular ridge 9.

In assembling the meter the top of the anode chamber is open. The cathode is sealed in its proper position in the cathode chamber. The meter is then filled with a suitable electrolyte 20, such as a solution of a double salt of potassium sulfocyanid and mercuric chlorid. The portion of the leading-in wire 16 extending within the anode chamber is bent toward the wall of the chamber, as indicated in dotted lines in Fig. 4, and the movable diaphragm placed in position upon the supporting ridge 9. The leading-in wire is then bent back to its normal position, as indicated in full lines in the figures of the drawings. Mercury is then added to the anode chamber, and the top of this chamber sealed in order to hermetically inclose all of the operative elements of the meter.

The operation of the meter will be readily understood from the foregoing description. When the meter is in its normal operating position, the movable diaphragm rests upon the supporting ridge 9 and prevents the passage of mercury from the anode chamber except electrolytically. If the meter is tilted out of its normal operating position, as indicated in Fig. 2 of the drawings, the movable diaphragm falls away from the annular ridge 9 and engages with the protuberances 15 and leading-in wire 16, thus permitting the free passage of mercury collected in the fall tube below the anode chamber. The movable diaphragm thus acts as a valve, preventing the passage of mercury from the body of anode mercury to the cathode except electrolytically when the vessel is in its normal operating position, and permitting the free passage of mercury deposited at the cathode to the body of the anode mercury when the vessel is tilted out of its normal operating position. The meter reader thus notes the height of the mercury in the fall tube and then tilts the meter, thereby emptying the fall tube and returning the deposited mercury to the anode chamber. Upon returning the meter to its normal operating position, the movable diaphragm drops into position on the ridge 9, and the meter is again ready for service.

The movable diaphragm which I have devised permits of a decidedly novel construction of electrolytic meter possessing several advantages. The movable diaphragm supports the anode mercury, and by its action as a valve allows the mercury which has deposited in the fall tube to be returned to the anode chamber through the anode opening itself, thereby doing away with the necessity of having any other channel between the anode and cathode chambers. Consequently, the diameter of the containing vessel is determined by the size of the diaphragm itself, and can be made less than one-tenth the size heretofore necessary in this type of meter to accommodate the same size electrodes. Furthermore, by the use of a movable diaphragm the containing vessel can be sealed off with the diaphragh in place, thus enabling an integrally constructed vessel to be employed as a container for the operative elements of the meter, and so eliminating the multi-part containing vessels with ground joints heretofore necessary in electrolytic meters of this type.

While I have herein illustrated and described the best embodiment of my invention now known to me, it will be understood that such illustration and description is by way of example, and that I do not desire to limit myself to the details of construction so illustrated and described. I, accordingly, aim in the appended claims to cover all modifications of my invention within the spirit and scope thereof.

What I claim as new and desire to secure by Letters Patent of the United States, is:—

1. An electrolytic meter comprising a containing vessel integrally constructed and hermetically inclosing the operative elements of the meter, said operative elements comprising an electrolyte, a cathode, a body of anode mercury, and a movable diaphragm adapted to act as a valve, preventing the passage of mercury from the anode to the cathode, except electrolytically, but permitting the return of the mercury deposited at the cathode to the body of anode mercury.

2. An electrolytic meter comprising a containing vessel integrally constructed and hermetically inclosing the operative elements of the meter, said operative elements comprising an electrolyte, a cathode, a body of anode mercury, and a movable diaphragm of finely woven silk fabric adapted to act as a valve, preventing the passage of mercury from the anode to the cathode, except electrolytically, but permitting the return of the mercury deposited at the cathode to the body of anode mercury.

3. An electrolytic meter comprising a containing vessel, an electrolyte, a cathode, a body of anode mercury, and a movable diaphragm of a material permeable to the electrolyte, but not to mercury, operatively arranged to separate the anode mercury from the cathode.

4. An electrolytic meter comprising a containing vessel, an electrolyte, a cathode, a body of anode mercury, and a movable diaphragm of a material permeable to the electrolyte, but not to mercury, adapted to act as a valve, preventing the passage of mercury from the anode to the cathode, except electrolytically, but permitting the return of the mercury deposited at the cathode to the body of anode mercury.

5. An electrolytic meter comprising a containing vessel, an electrolyte, a cathode, a body of anode mercury, and a movable diaphragm of finely woven silk fabric adapted to act as a valve, preventing the passage of mercury from the anode to the cathode, except electrolytically, but permitting the return of the mercury deposited at the cathode to the body of anode mercury.

6. An electrolytic meter comprising a containing vessel, an electrolyte, a body of anode mercury, a movable diaphragm of a material permeable to the electrolyte, but not to mercury, arranged within said vessel and adapted to mechanically support the anode mercury when the vessel is in its normal operating position, means limiting the movement of the diaphragm when the meter is tilted out of its normal operating position, and a cathode below the diaphragm.

7. An electrolytic meter comprising a containing vessel, an electrolyte, a body of anode mercury, a movable diaphragm of a material permeable to the electrolyte, but not to mercury, arranged within said vessel and adapted to act as a valve, preventing the passage of mercury from the body of anode mercury, except electrolytically, when the vessel is in its normal operating position, and permitting the free passage of mercury to the body of anode mercury when the vessel is tilted out of its normal operating position, and a cathode below the diaphragm.

8. An electrolytic meter comprising a containing vessel, an electrolyte, a cathode, a body of anode mercury, and a movable diaphragm of finely woven silk fabric adapted to act as a valve, preventing the passage of mercury from the body of anode mercury to the cathode, except electrolytically, when the vessel is in its normal operating position, and permitting the free passage of mercury deposited at the cathode to the body of anode mercury when the vessel is tilted out of its normal operating position.

9. An electrolytic meter comprising a containing vessel, an electrolyte, a cathode, a body of anode mercury, a diaphragm having a supporting member to which is suitably secured a piece of material permeable to the electrolyte, but not to mercury, said diaphragm being movably mounted in said vessel and adapted to mechanically support the anode mercury when the vessel is in its normal operating position, and to permit the free passage of mercury deposited at the cathode to the body of anode mercury when the vessel is tilted out of its normal operating position.

10. An electrolytic meter comprising a containing vessel having an interior ridge, an electrolyte, a cathode, a body of anode mercury, and a diaphragm of a material permeable to the electrolyte, but not to mercury, resting on said ridge and adapted to mechanically support the anode mercury when the vessel is in its normal operating position, and means limiting the movement of the diaphragm away from the ridge when the vessel is tilted out of its normal operating position.

11. An electrolytic meter comprising a containing vessel having a ridge on its interior surface, an electrolyte, a cathode, a body of anode mercury, a diaphragm having a supporting member to which is suitably secured a piece of finely woven silk fabric, said diaphragm resting upon said ridge and adapted to mechanically support the anode mercury when the vessel is in its normal operating position, and means limiting the movement of said diaphragm when the vessel is tilted out of its normal operating position.

In witness whereof, I have hereunto set my hand this twenty-fifth day of March, 1914.

JAMES N. TUTTLE.

Witnesses:
JOHN A. McMANUS, Jr.,
HENRY A. ANDERSEN.